July 18, 1933. L. A. WHITMER 1,918,729
FEEDING TROUGH
Filed Nov. 7, 1931 2 Sheets-Sheet 2
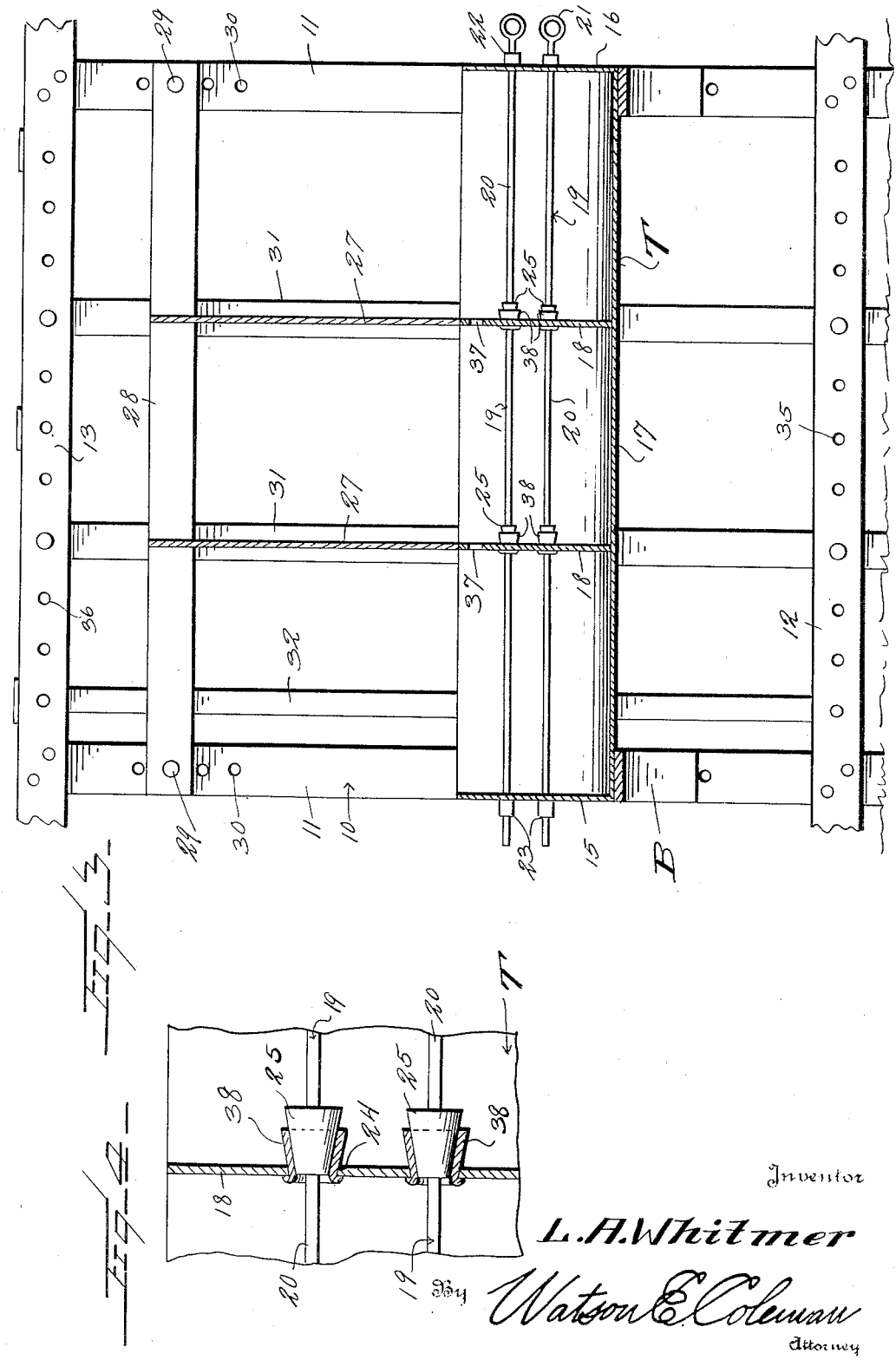
Inventor
L. A. Whitmer
By Watson E. Coleman
Attorney

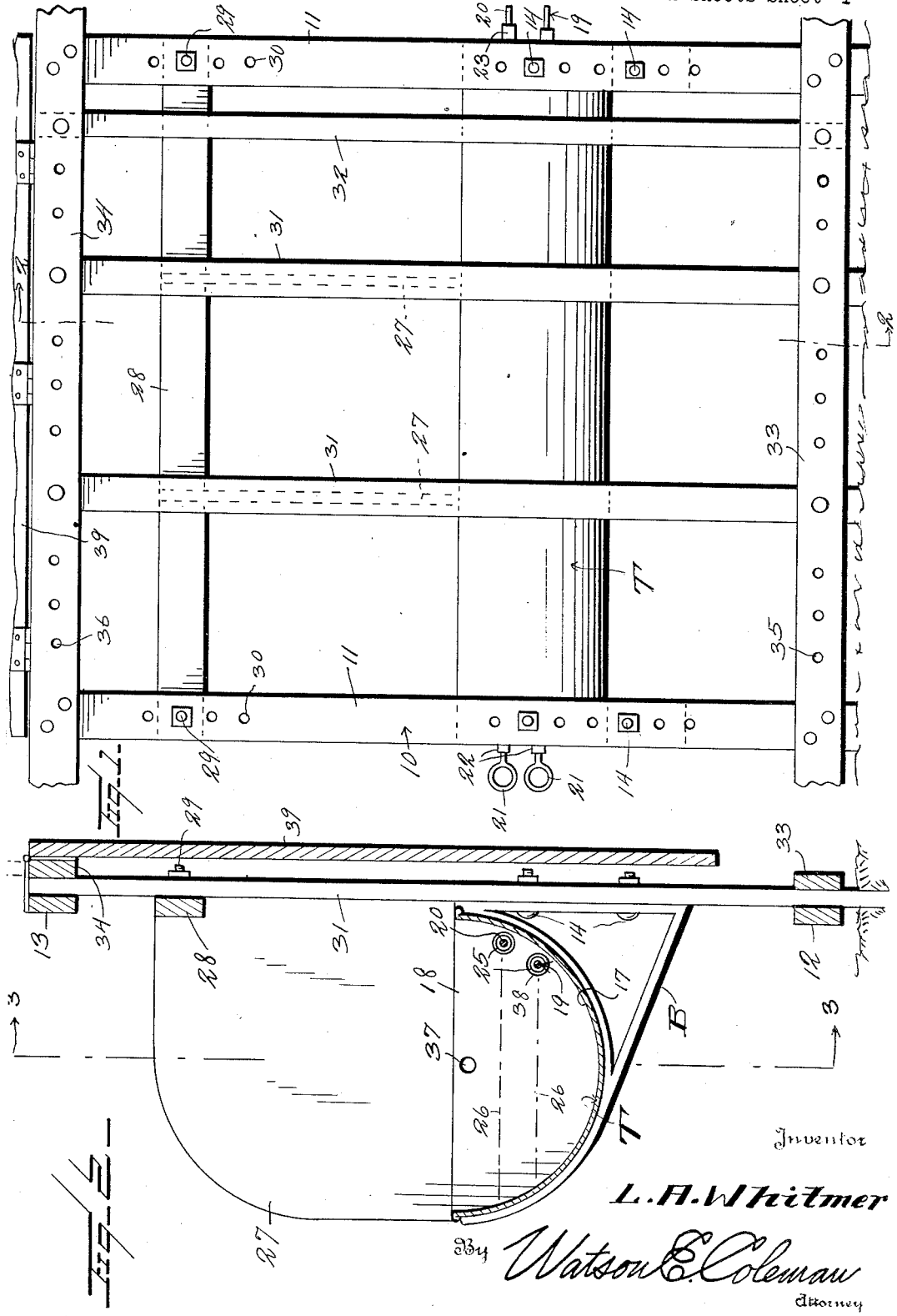

Patented July 18, 1933

1,918,729

UNITED STATES PATENT OFFICE

LEE A. WHITMER, OF WILTON JUNCTION, IOWA

FEEDING TROUGH

Application filed November 7, 1931. Serial No. 573,672.

This invention relates to feeding troughs, and more particularly to a feeding trough adapted for use in the feeding of calves or other small animals.

An object of this invention is to provide a feeding trough which is so constructed as to permit the insertion of a predetermined quantity of feeding material in the trough so that each animal feeding therefrom will receive sufficient food.

Another object of this invention is to provide in a feeding trough of this kind means whereby a number of animals may feed from the same trough without disturbing the other animals and without taking any of the feed away from other animals which are feeding from the same trough.

A further object of this invention is to provide in a device of this kind, means whereby the larger animals are prevented from feeding from the same trough as the smaller animals, so that the larger animals will not deprive the smaller animals of the food which is especially prepared for the smaller animals.

The above and various other objects and advantages of this invention will in part be described in and in part be understood from the following detailed description of the present preferred embodiment, the same being illustrated in the accompanying drawings, wherein:—

Figure 1 is a detail front elevation of a device constructed according to the preferred embodiment of this invention;

Figure 2 is a vertical section taken substantially on the line 2—2 of Figure 1;

Figure 3 is a sectional view taken on the line 3—3 of Figure 2;

Figure 4 is an enlarged fragmentary sectional view partly in detail showing the means for permitting the liquid food to pass from one trough section to another so that the quantity of feed in each trough may be equalized.

Referring to the drawings, wherein like numerals of reference designate corresponding parts throughout the several views, the numeral 10 designates generally an upright or standard which comprises a plurality of vertically disposed supporting bars 11 to which are secured a lower horizontal bar 12 and an upper horizontal bar 13 by means of bolts or other securing members. The uprights 11 and the lower and upper horizontal bars 12 and 13, respectively, comprise a frame structure supported in a vertical position.

A feeding trough T is secured in vertically adjusted position on the frame 10 by means of brackets B or the like, which are secured in adjusted position to the uprights 11 by means of bolts 14, or the like. This trough T is supported rearwardly of the frame 10 and is provided with closed end portions 15 and 16.

The bottom 17 of the trough T is of desired configuration and in the present embodiment is disclosed as being arcuate in cross section, and is provided intermediate the ends thereof with partitions or dividing walls 18, so as to longitudinally divide the trough T into any desired number of feeding spaces wherein the calves or other small animals may feed. In the troughs at present in use, where the troughs are provided with partitions intermediate the ends thereof, it is necessary, in order to place an equal quantity of food in each section, to take a pail or other receptacle and measure by means of the pail the quantity of food placed in each feeding section.

In order, however, to provide means whereby the quantity of food in each feeding section or chamber may be equalized, I have provided equalizing members, generally designated as 19, which extend longitudinally of the trough T and by means of which the quantity of food in each chamber may be equalized. These equalizing members 19 comprise an elongated rod 20 having loops or handles 21 at one end, which handle 21 is disposed outwardly of one end of the trough T and at each end, the trough T is provided with packing glands or bearings 22 and 23, so that no liquids within the trough T will leak out around these rods 20.

The partitions or dividing walls 18 are provided with tapering passages 24 within which a substantially frusto-conical closure 25 is adapted to seat, this frusto-conical closure member 25 being secured to the rod 20 in a position for engagement with the aperture 24 upon movement of the equalizing member 19 in one direction.

Preferably, the trough T is provided with a number of these equalizing members 19, which are spaced apart the desired distance so that when one of these equalizing members 19 is moved into open position, a predetermined quantity of food will be positioned in each feeding section. If desired, the wall sections 18 may be provided with horizontally disposed lines or markings 26 indicating a predetermined quantity of liquid or food in the feeding section, this line or indicia being in horizontal alinement with a passage 24.

In order to provide means whereby only one animal may feed at a time from each of the feeding sections, I have provided dividing walls 27, which are secured to a horizontally disposed bar 28 and which extend rearwardly of the frame 10. This horizontal bar 28 is secured in vertically adjusted position by means of bolts 29, or the like, which are positioned in selected holes 30 provided in the uprights 11. The front edge of the dividing walls 27 have a vertically disposed bar 31 secured thereto, so that the dividing wall 28 will be protected at the front edge thereof.

In order to prevent the larger animals from feeding from the trough T, I have provided adjustable vertically disposed bars or stanchion members 32 which are mounted for horizontal adjustment at one end between the horizontal bar 12 and a horizontal bar 33. The upper end of each member 32 is disposed between the horizontal bar 13 and a front horizontal bar 34. These horizontal bars 12, 33, 13 and 34 are provided with registering openings or passages 35 for receiving securing pins, and in like manner, the lower end of the vertical bars 32 are provided with openings for receiving the adjusting pin so that these adjusting bars 32 may be moved longitudinally of each feeding section.

The upper bars 13 and 34 are provided with registering passages 36 so that the upper ends of the adjusting bars 32 may be properly adjusted. Each dividing wall 18 is also provided adjacent the upper end thereof with a passage or opening 37, which is positioned adjacent the upper end of the wall 18, so that when the trough T is filled to a point where the liquid is level with this opening 37, the trough will be substantially filled. The intermediate openings 24 may have a tapering bushing 38, so as to provide a relatively large seat for the closure members 25, particularly where the dividing walls 18 are made of sheet metal which is relatively thin.

A guard or plate member 39 is hingedly secured at the upper end thereof to the upper end of the frame 10, and when in depending position, overlies the front of the frame 10, so as to prevent any animals or the like from feeding from the trough T. Through the use of this guard or plate 39, the animals may be prevented from feeding from the trough except during stated periods. This plate 39 may be swung upwardly and supported in any desired manner in an upraised position, so that the animals may readily project their heads between the intermediate bars 31 and the adjustable bars 32, and feed out of the trough sections which are filled with a predetermined quantity of food.

While I have shown a feeding device provided with three feeding chambers or reservoirs, I do not wish to be limited to any particular number of feeding chambers, as this device may be constructed in any desired length and provided with any desired number of feeding chambers, depending only upon the number of animals which are to be fed at one time from the device.

In the operation of this device, the food may be poured into one of the feeding chambers of the trough T, and the desired equalizing member 19 pulled horizontally so as to open the passages 24 and permit the food to flow into the various feeding sections of the trough T. During the period when it is desired to feed the animals, the door or guard plate 39 is held in upraised position and the adjustable vertical bars 32 are adjusted horizontally so that only sufficient space is provided between the bars 32 and the intermediate bars 31 for the small animals to project their heads therebetween.

It will be obvious, from the foregoing, that a relatively simple feeding trough has been disclosed wherein a predetermined quantity of food will be placed at the disposal of each animal, and the larger animals will be prevented from taking the food away from the smaller animals. Through the use of this device, any special food may be given the smaller animals which will not be taken by the larger animals and, therefore, the smaller animals will derive the entire benefit of the special kind of food which may be placed at their disposal.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A feeding trough comprising a frame, a trough member supported on one side of the frame, a plurality of partitions disposed within the trough whereby to divide the trough into a plurality of feeding sections, said partitions having vertically spaced openings therethrough, the opening of one partition aligning with the openings of adjacent partitions, a horizontally movable bar for each series of openings carried by the trough and extending through said openings, and means carried by said bar for closing said openings upon movement of the bar in one direction.

2. A feeding trough comprising a frame, a trough supported on one side of the frame, partitions mounted within the trough whereby to divide the trough into a plurality of feeding sections, said partitions having vertically spaced openings therethrough, closure means for the openings, and operating means for said closure means for closing selected openings whereby to permit an equal quantity of fluid to be placed in each of the feeding sections.

LEE A. WHITMER.